E. E. WALKER & J. W. COX.
ELECTRIC HEATING FURNACE.
APPLICATION FILED JAN. 2, 1917. RENEWED JULY 11, 1917.

1,256,958.

Patented Feb. 19, 1918.

Inventor
Edward E. Walker
and
John W. Cox

By

Attorney

UNITED STATES PATENT OFFICE.

EDWARD E. WALKER AND JOHN W. COX, OF ERIE, PENNSYLVANIA.

ELECTRIC HEATING-FURNACE.

1,256,958.   Specification of Letters Patent.   Patented Feb. 19, 1918.

Application filed January 2, 1917, Serial No. 140,010. Renewed July 11, 1917. Serial No. 180,016.

*To all whom it may concern:*

Be it known that we, EDWARD E. WALKER, a citizen of the United States, and JOHN W. COX, a subject of the King of Great Britain, having declared my intention of becoming a citizen of the United States, residing at Erie, in the county of Erie and State of Pennsylvania, have invented new and useful Improvements in Electric Heating-Furnaces, of which the following is a specification.

This invention relates to electric heating furnaces and consists in certain improvements in the construction thereof as will be hereinafter fully described and pointed out in the claims.

The object of the invention is to utilize an electric arc for a heating furnace. In carrying out the invention a liquid electrode is utilized which diffuses the intense heat of the arc, thus prolonging the life of the electrode and so extending the heat area as to make it effective as a heating unit.

The invention is illustrated in the accompanying drawings as follows:—

Figure 1:
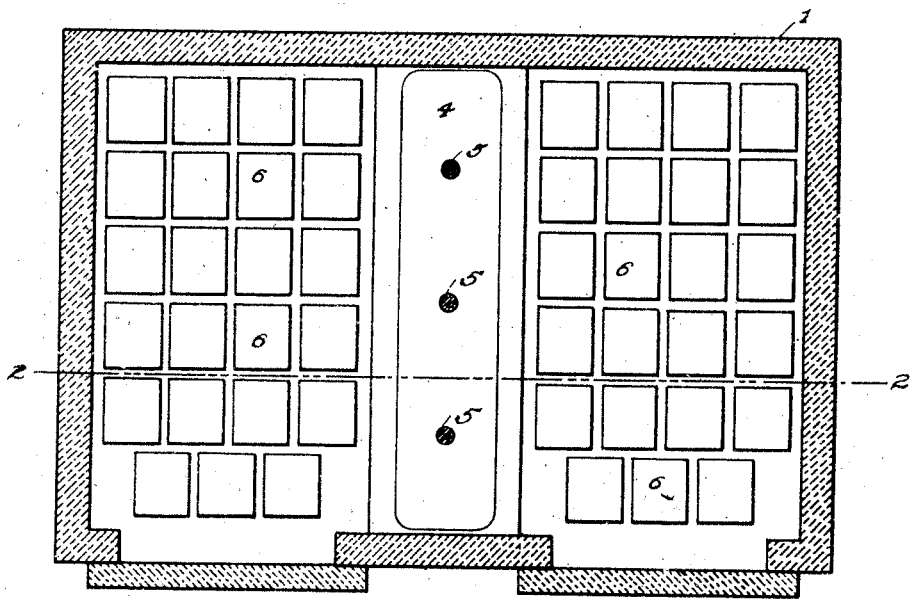
Figure 1 shows a horizontal section on the line 1—1 in Fig. 2.
Figure 2:
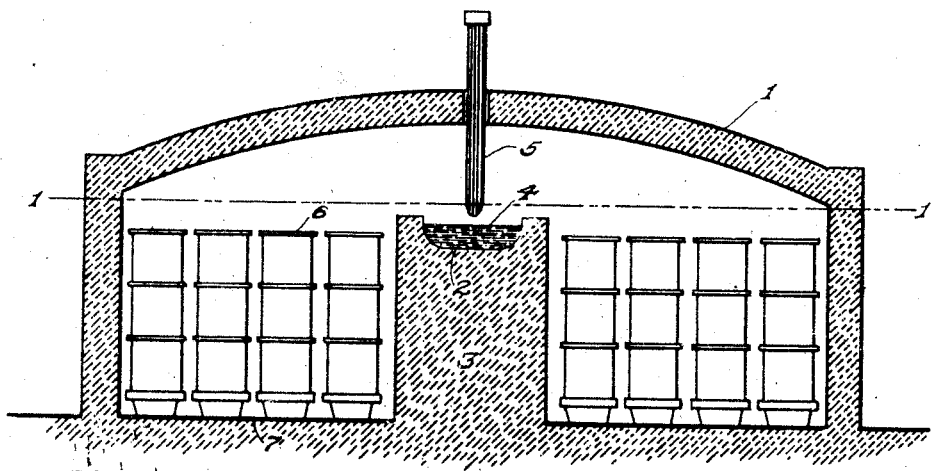
Fig. 2 shows a vertical section on the line 2—2 in Fig. 1.

1 marks the furnace wall, 2 a receptacle arranged within the space inclosed by the wall, 3 a support for the receptacle, 4 a liquid electrode, 5 a second electrode adapted to act with the liquid electrode, and 6 receptacles for materials to be treated, as for instance, iron castings under treatment to anneal them so as to form malleable castings. These are arranged on the supporting floor 7 at the sides of the receptacle 2.

Any metal fusing under an arc and having electric conductivity may be used for the electrode 4, for instance iron may be used. The liquid electrode is agitated and the heat from the arc is thereby diffused throughout the liquid and diffused from the liquid, the liquid giving a large radiating surface effective for this purpose. The upper wall of the furnace receives and deflects this heat so that the heat is diffused throughout the furnace and communicated to the material being treated. The liquid electrode may be variously placed with relation to the walls of the furnace depending on the material to be treated and the convenience in operation.

We are aware that furnaces have been constructed for melting metals in which the metal is subjected to an electric current but in these furnaces the effort is to conserve the heat in the metal rather than to dissipate it as in the present invention.

The liquid electrode may be made molten or liquid through the action of the arc or may be introduced to the receptacle in this condition.

What we claim as new is:—

1. In a heating furnace, the combination of an inclosing wall; a supporting floor for material to be treated; a heat diffusing electrode liquid under the heat of an arc; and a second electrode for completing the arc.

2. In a heating furnace, the combination of an electrode receptacle; an electrode in liquid form in the receptacle, the receptacle giving the liquid a heat diffusing area; an inclosing wall including a space of greater area than the liquid electrode; and a second electrode.

3. In a heating furnace, the combination of a heat diffusing element in the form of a liquid electrode; and means for completing the arc with said electrode.

4. In a heating furnace, the combination of a heat diffusing element in the form of a liquid electrode; means for completing the arc with said electrode; and a heat diffusing wall out of contact with the liquid electrode and in position to receive and deflect heat from said liquid electrode.

5. In a heating furnace, the combination of a heat diffusing element in the form of a liquid electrode; an inclosing wall including a space of greater area than the electrode, said wall being positioned to receive and deflect the heat from the liquid electrode; and a second electrode acting in connection with the liquid electrode.

In testimony whereof we have hereunto set our hands.

EDWARD E. WALKER.
JOHN W. COX.